United States Patent [19]

Lok

[11] Patent Number: 5,112,792
[45] Date of Patent: May 12, 1992

[54] NICKEL/SILICA CATALYST AND THE PREPARATION AND USE THEREOF

[76] Inventor: Cornelis M. Lok, Domela Nieuwenhuisstraat 14, 6941 BL Didam, Netherlands

[21] Appl. No.: 524,262

[22] Filed: May 16, 1990

[30] Foreign Application Priority Data

May 16, 1989 [EP] European Pat. Off. ........ 89201229.5

[51] Int. Cl.$^5$ .................... B01J 21/14; B01J 23/78
[52] U.S. Cl. ................................. 502/250; 502/234; 502/252; 502/259
[58] Field of Search ............... 502/252, 259, 328, 250, 502/234

[56] References Cited

U.S. PATENT DOCUMENTS

| | | | |
|---|---|---|---|
| 3,557,242 | 1/1971 | Sampson et al. | 502/252 |
| 3,673,115 | 6/1972 | Linsen et al. | 502/259 |
| 3,759,843 | 9/1973 | Holscher et al. | 502/259 |
| 3,868,332 | 2/1975 | Carter et al. | 502/259 |
| 4,670,416 | 6/1987 | Klimmek et al. | 502/259 |

FOREIGN PATENT DOCUMENTS 0114704 8/1984 European Pat. Off. .

Primary Examiner—Carl F. Dees
Attorney, Agent, or Firm—Cushman, Darby & Cushman

[57] ABSTRACT

The invention provides a nickel/silica catalyst optionally also containing cations of a lower Group II metal (X), which catalyst satisfies the following combination of features:

1) a molar ratio of $SiO_2/Ni = 0.15 = 0.35$
2) a molar ratio of $X/Ni = 0-0.15$
3) an active nickel surface area above $120 m^2/g$
4) a BET surface area of which at least 60% is found with pores with a radius below 1.5 nm.

Preferably the catalyst has an atomic X/Ni ratio between 0.5–0.10 and a BET surface area of which at least 60% is found in pores having a pore radius of below 1.4 nm. The group II metal X is preferably magnesium or barium.

13 Claims, No Drawings

NICKEL/SILICA CATALYST AND THE PREPARATION AND USE THEREOF

The invention relates to a nickel/silica catalyst which optionally comprise cations of a lower Group II metal (X), to a process for the preparation of such a catalyst and to a hydrogenation process using this catalyst. More in particular the invention relates to a catalyst suitable for the hydrogenation of unsaturated organic compounds, especially fatty acids.

Nickel/silica catalysts which optionally comprise ions of another metal are known from the prior art and often they are obtained by coprecipitating methods in which the metal and silica are precipitated simultaneously from a metal salt/waterglass solution by means of an alkaline precipitating agent. Such a method is disclosed in DE-A-263901 (NL Industries Inc).

EP-A-0031472 (Ruhrchemie) discloses a catalyst prepared by impregnating a porous silica and/or alumina material with metal salt solutions, sometimes with nickel and magnesium salt solutions, followed by filtering, drying, calcining and reduction. The catalyst is suitable for methanation processes.

European patent specification EP-A-322049 (Unilever), published 28 June 1989 describes the preparation and use of a nickel/silica catalyst which may comprise ions of a lower Group II metal (X). This catalyst satisfies the following combination of features:
1) a molar ratio of $SiO_2/Ni = 0.15 - 0.35$
2) a molar ratio of $X/Ni = 0 - 0.15$
3) an active nickel surface area above $120 m^2/g$
4) a BET surface area of which at least 40% is found with pores with a radius above 2.5 nanometers, also this catalyst contains at least 50% of nickel.

This catalyst, which has according to 4) mainly fairly wide pores is very suitable for the selective hydrogenation of vegetable and animal oils and fats and combines excellent activity and selectivity.

However, this latter catalyst and most other catalysts are ideally not suitable for the hydrogenation of fatty acids and unsuitable for the hydrogenation of a feedstock of fatty acids containing 10 to 50 ppm of sulphur compounds (calculated as sulphur) such as e.g. undistilled fatty acids of animal origin such as undistilled tallow fatty acids, undistilled soya bean fatty acids and undistilled rape seed fatty acids and so called "acid oils". When hydrogenating this type of feedstock at reasonable nickel levels the hydrogenation tends to stop when reaching an iodine values between 10 and 50 due to poisoning of the catalyst.

The present invention provides a catalyst which is very suitable for the hydrogenation of fatty acids, especially those containing sulphur contaminants. This novel catalyst is characterized by the following combination of features:
1) a molar ratio of $SiO_2/Ni = 0.15 - 0.40$
2) a molar ratio of $X/Ni = 0 - 0.15$
3) an active nickel surface area above $120 m^2/g$ nickel.
4) a BET surface area of which at least 55% is found with pores having a radius below 1.5 nanometers.

This catalyst has unusual narrow pores and when used under standard conditions of 0.4% of nickel shows a high activity leading in the case of standard soya bean fatty acids to an end iodine value of below 2, often below 1.

Preferably the pores of the catalyst are so narrow that at least 60%, most preferably at least 65% of the BET surface area is found with pores having a radius below 1.5 nanometers. This percentage of the surface in the pores above or below a certain pore radius is a better yardstick for catalytic performance than a calculated average pore radius because such a figure ignores the distribution of pore radii. The percentage of the surface in pores above or below a certain pore radius can be determined together with catalyst surface area, pore volume by nitrogen adsorption techniques known as the extended Brunauer, Emmett and Teller (BET) method.

Preferably the composition of the catalyst is such that the molar ratios $X/Ni = 0.05 - 0.10$ and $SiO_2/Ni - 0.20 - 0.30$.

In another embodiment the lower Group II metal has an atomic number below 60, more preferably X is a Group IIa metal such as magnesium or barium, and the former is preferred.

The present invention provides a catalyst in which the active nickel surface area is above $120 m^2/g$ of nickel. Also generally the catalyst according to the present invention has a pore volume of at most 0.35 ml/g, preferably at most 0.28 ml/g catalyst.

As to catalytic performance the present novel catalysts are such that the standard soya bean fatty acid activity as defined below is such that the end iodine value of standard undistilled fatty acids under standard conditions is below 2, preferably below 1.

Usually the catalyst according to the present invention has an active nickel surface area of above 120, preferably above $130 m^2/g$. Also the catalyst according to the present invention contains as a rule at least 50%, preferably at least 65% of nickel. As to catalytic properties the catalyst according to the present invention normally shows an activity of the catalyst by hydrogenation of standard undistilled soya bean fatty acids under standard conditions as defined below leads to an end iodine value below 5, preferably below 1.

The catalyst according to the present invention can conveniently be prepared by continuously precipitating nickel ions from an aqueous salt solution, optionally together with X-ions, with an excess alkaline precipitating agent in a stirred reactor with a residence time of between 20 and 120 seconds, followed by continuous addition of aqueous silicate solution, optionally in a second reactor, collecting, drying and reducing the precipitate characterized in that the temperature of the suspension when adding the aqueous silicate solution is between 90 and 95° C., for a period of between 10 and 300 minutes preferably between 30 and 60 minutes.

As a rule the reactor(s) contain a device for vigorously agitating the liquid. After the second reactor the suspended unreduced catalyst is separated, usually by filtration, but prior to that it is kept in a storage tank at an elevated temperature, preferably at a temperature between 75 and 95° C. where it is mildly stirred. Also there is the possibility of dosing the silicate to the suspension in more than one reactor, but the total average residence time in this step should remain within the indicated range. The precipitation of the catalyst can be carried out discontinuously (batchwise) or continuously (e.g. by the cascade method). Stirring of the reactor(s) is preferably carried out with an input of mechanical energy of 5 - 2000 Watt per liter of solution.

Nickel compounds which can be used as starting material for the preparation of the catalyst according to the present invention are watersoluble nickel compounds such as nitrate, sulphate, acetate, chloride or formate. The solution fed into the first reactor contains between 10 and 80 grams of nickel per liter, particularly preferred are solutions containing between 25 and 60 g metal per liter. The Group II metal compound, in particular magnesium, is conveniently also used in the form of a watersoluble compound such as the nitrate or chloride. Alkaline precipitation agents which may be used as starting material in the precipitation step are alkali metal hydroxides, alkali metal carbonates, alkali metal bicarbonates, the corresponding ammonium compounds and mixtures of these compounds. The concentration of the alkaline precipitation agent which is fed in stoichiometric excess into the first reactor is preferably 20 to 300 grams of alkaline material per liter (calculated as dry material) as far as the solubility permits to do so, more particularly between 50 and 250 g per liter.

Preferably precipitation of nickel ions and optionally X-ions with alkaline precipitation agent takes place at a temperature of between 20° and 95° C. and the aqueous silicate is added at a reactor temperature between 90° and 95° C. Ageing or maturing of the suspension in an ageing or optionally filtering tank takes place at a temperature between 75° and 95° C., preferably between 80° and 90° C.

Suitable soluble silicates used in the preparation of the catalysts according to the present invention are alkali silicates, more especially sodium silicate and neutral silicate such as Na2O.3SiO3 is preferred. The addition of soluble silicate should take place as quickly as possible after precipitation of the metal(s), preferably within 100 seconds.

The amounts and ratios of nickel, Group II metal, soluble silicate and alkaline precipitating agent added to the reactors depend on the desired composition of the eventual catalyst and can be easily calculated.

The catalysts according to the present invention may contain a water insoluble carrier material which was already present during the preparation or was added thereto later. Suitable carrier materials are e.g. silica containing materials like kieselguhr, aluminium trioxide (alumina) and silicates as bentonite. According to the present invention, however preferably no insoluble carrier is used. Nevertheless for special purposes the presence of an insoluble carrier can be desirable (e.g. as a filter aid). If insoluble carrier material is used, this material can be added (a) direct as such, (b) as an aqueous suspension, (c) preferably as a suspension in the aqueous solution of a metal salt, or (d) as a suspension in the aqueous solution of the alkaline precipitating agent.

In a preferred embodiment, in which the precipitation of the metal ions is carried out continuously, the amounts of solutions to be fed into the first reactor are dosed by determining, optionally continuously, the alkalinity (= normality) of the discharged liquid. This can also be done by pH determination (pH 7-10). The temperature at which the precipitation of the metal(s) takes place can conveniently be controlled by adjusting the temperatures of the solutions fed in. In any of the two or more reactors or the storage tank prior to filtration other compounds, if any, may be added such as a carrier material, some alkaline solution and/or possible promotors such as copper, zirconium, cobalt, molybdenum, silver, possibly other metals or combinations thereof so that their amount in the eventual catalyst does not exceed 10 mole percent of the metal content.

After the silicate addition has been completed the solid components are separated from the mother liquor, washed with water if necessary, e.g. in the presence of a surface active material or organic solvent, e.g. acetone, and subsequently dried by means of spray-drying, freeze-drying, or oven-drying.

Thereafter, if desired, the dry solid material is optionally ground and/or calcined and then activated (=reduced) with hydrogen gas at an increased temperature, which as a rule lies between 300° and 450° C. The activation can take place at atmospheric or under reduced pressure. The reduced catalyst so obtained is then usually suspended in hydrogenated fatty material, often triglyceride oil or fatty acids.

Another embodiment of the invention provides a method for the hydrogenation of unsaturated organic compounds, in particular fatty acids, more especially those which are undistilled and contaminated with 10 to 50, more particularly 20 - 30 ppm of sulphur compounds (calculated as sulphur). These hydrogenations are carried out conveniently at an increased temperature (80° - 250° C.) and optionally increased pressure (1.0 to 5 MPa) with hydrogen. The amount of catalyst employed ranges between 0.05 and 0.8% of nickel calculated on the fatty acids. Especially at pressures below 1.7 MPa performance was excellent.

The hydrogenated fatty material, especially fatty acids, so obtained show a favourable combination of properties such as low iodine value (below 3, most preferably below 1), and have a good stability and a light colour.

The invention is illustrated by the following examples:

EXAMPLE 1

Aqueous solutions of a) the nitrate salts of Ni and Mg (0.6 M Ni and 0.06 M Mg) and b) Na2CO3 (10 wt %) were continuously pumped at equal flow rates into a vigorously stirred precipitation reactor during which Ni and Mg precipitated forming a mixed Ni/Mg hydroxycarbonate. The precipitation took place at a temperature of 50° C. and at a pH of 8.8. In the precipitation reactor the suspension had an average residence time of 25 sec. The suspension was continuously transferred into a second, stirred reactor (energy input 4 Watt/liter) in which the average residence time was 30 minutes and the temperature was 92° C. and a pH of 8.9. Simultaneously an amount of silicate ions were dosed into this reactor continuously in the form of waterglass (2% SiO2) whilst maintaining the temperature. The SiO2/Ni molar ratio was 0.21. The suspension discharged by the second reactor was continuously fed into a large filter storage tank from which the suspension was led to a filter where the precipitate was washed with water of 80° C. to remove Na+ ions. The washed green filtercake was then dried in a spray dryer at 120° C.

Thereafter the green powder was reduced in a H2 atmosphere for 30 minutes at a temperature of 430° C. to give the active catalyst. The catalyst was characterized by the following chemical and physical methods:

1. The chemical composition expressed as a SiO2/Ni or (SiO2+X)/Ni (molar ratio) was determined by X-ray fluorescence.
2. The active nickel surface area (expressed as m2/g nickel was determined by H2 chemisorption after reduction of the green cake at 430° C.
3. The catalyst surface area, pore volume and the pore size (distribution) were determined by nitrogen adsorption (Brunauer, Emmett and Teller method, BET). To this end the green cake was reduced at 430° C. and the resulting pyrophoric catalyst was passivated in a 1% O2/N2 gas mixture at 10° C.

The results of the above determinations are given in Table 1, where a comparison is made with two catalysts of identical composition but prepared at silicate addition temperatures of 96° and 98° C. The catalytic activities of the catalyst were determined by hydrogenating standard soya bean fatty acids with an S-content of 33 ppm, iodine value of 126, acid value 200, saponification value 202, soap content 0.04% and water content 0.11%. The hydrogenation was carried out at the following conditions: Catalyst dosage 0.45% (as Ni)

| Temperature | 220° C. |
|---|---|
| Pressure | 1.5 MPa |
| reaction time | 2.0 hrs |

Catalytic performance is expressed as end iodine value.

|  | Example 1 | Comparison 1 | Comparison 2 |
|---|---|---|---|
| Temperature of silicate addition | 92° C. | 96° C. | 98° C. |
| End Iodine value | 2.0 | 10.1 | 57.2 |
| SiO$_2$/Ni (molar) | 0.21 | 0.21 | 0.20 |
| Mg/Ni (molar) | 0.10 | 0.10 | 0.10 |
| Ni surface area m$^2$/g (Ni) | 130 | 128 | 148 |
| BET surface area (m$^2$/g) | 262 | 274 | 319 |
| Percentage of catalyst surface in pores below 1.5 nm radius | 63 | 40 | 28 |

The catalytic activity and selectivity of the catalyst were determined by hydrogenating two types of edible oil i.e. soybean oil and refined fish oil.

EXAMPLE 2

The catalyst of Example 1 (silicate addition at 92° C.) was used in the hydrogenation of tallow fatty acids (containing 10 ppm of S), having an iodine value of 58. The conditions were:

| Catalyst dosage | 0.022% (as Ni) |
|---|---|
| Temperature | 200° C. |
| Pressure | 1.4 MPa |
| Reaction time | 3 hours |

The end iodine value was 1.0 (after 2 hrs 1.6). A reference catalyst with wider pores 45% of the surface area in pores smaller than 1.5 nm yielded an end iodine value 22 (after 3 hrs).

EXAMPLE 3

As Example 1, but nickel nitrate was replaced by nickel sulphate as raw material (same amount of Nickel) and a silicate dosing temperature of 94° C. was applied. The resulting end iodine value in the soya bean fatty acid hydrogenation test was 2.4.

EXAMPLE 4

As Example 1, but the silica/nickel ratio was raised to 0.24, the Mg/Ni ratio was 0.10 and the reduction temperature was lowered from 430° to 400° C. This resulted in a catalyst of the following features:

Active nickel surface area 123 m$^2$/g (Ni)
BET-surface area 303 m$^2$/g catalyst
pore volume 0.26 ml/g catalyst Percentage of surface area in pores smaller than 1.5 nm is 68%. The end iodine value in the standard soya bean fatty acid hydrogenation test was 1.5.

I claim:
1. A nickel/silica catalyst which optionally also contains cations of a lower Group II metal (X), characterized in that the reduced catalyst satifies the following combination of features:
  1) a molar ratio of SiO$_2$/Ni=0.15 – 0.40
  2) a molar ratio of X/Ni=0 – 0.15
  3) an active nickel surface area above 120 m$^2$/g nickel
  4) a BET surface area of which at least 55% is found with pores having a radius below 1.5 nanometers.
2. A catalyst according to claim 1 characterized in that the BET surface area is such that at least 60% is found with pores having a radius below 1.5 nanometers.
3. A catalyst according to claim 1 or 2 characterized in that X/Ni=0.05 – 0.10.
4. A catalyst according to any of the preceding claims characterized in that the molar ratio of SiO$_2$/Ni is 0.20 – 0.30.
5. A catalyst according to any of the preceding claims characterized in that X is magnesium.
6. A catalyst according to any of the claims 1 to 4 characterized in that X is barium.
7. A catalyst according to any of the preceding claims characterized in that the active nickel surface area is above 130 m$^2$/g nickel.
8. A catalyst according to any of the preceding claims characterized in that the pore volume is at most 0.35 ml/g.
9. A catalyst according to any of the preceding claims characterized in that the pore volume is at most 0.28 ml/g.
10. A catalyst according to any of the preceding claims characterized in that the catalyst contains at least 50%; preferably at least 65% (w.w.) of nickel.
11. In a process for preparing a nickel/silica catalyst which optionally contains cations of a lower Group II metal (X) by continuously precipitating nickel ions from an aqueous salt solution optionally together with X-ions with an excess alkaline precipitating agent in a stirred reactor with a residence time of between 20 and 120 seconds followed by continuous addition of aqueous silicate solution, optionally in a second reactor, collecting, drying and reducing the precipitate, the improvement wherein the temperature of the suspension when adding the aqueous silicate solution is between 90 and 95, for a period of between 10 and 300 minutes.
12. A process according to claim 11 characterized in that at least one reactor is stirred with an input of mechnical energy of 5 – 2000 Watt per liter of solution.
13. The process of claim 11 wherein the suspension is added at a temperature between 92° and 94° C. for a period of 30 to 60 minutes.

* * * * *